United States Patent [19]

Geiger

[11] Patent Number: 5,792,490
[45] Date of Patent: Aug. 11, 1998

[54] DEVICE FOR TRANSPORTING A PARISON FROM THE TUBE FORMING HEAD TO THE BLOW MOLDING MACHINE

[76] Inventor: Albert Geiger, Maximilianshöhe 11, 82467 Garmisch-Partenkirchen, Germany

[21] Appl. No.: 620,938

[22] Filed: Mar. 22, 1996

[30] Foreign Application Priority Data

Mar. 30, 1995 [DE] Germany .................... 195 11 712.3

[51] Int. Cl.⁶ .................... B29C 31/08; B29C 49/42
[52] U.S. Cl. .................... 425/532; 425/534
[58] Field of Search .................... 425/532, 534

[56] References Cited

U.S. PATENT DOCUMENTS

| | | | |
|---|---|---|---|
| 4,865,799 | 9/1989 | Sadr | 425/532 |
| 5,030,083 | 7/1991 | Kohno et al. | 425/534 |
| 5,464,635 | 11/1995 | Geiger | 425/534 |

FOREIGN PATENT DOCUMENTS

| | | |
|---|---|---|
| 30 38 590 C2 | 11/1986 | Germany . |
| 43 05 735 C1 | 5/1994 | Germany . |
| 3-193326 | 8/1991 | Japan .................... 425/532 |
| 3-261534 | 11/1991 | Japan .................... 425/534 |

*Primary Examiner*—Robert Davis
*Attorney, Agent, or Firm*—Juettner Pyle Piontek & Underwood

[57] ABSTRACT

The parison transporting device includes two opposite side wall elements whose inner surfaces facing each other are curved in accordance with the mold cavity of the blow mold. Rods which in the longitudinal direction of the parison transporting device are mounted in offset relationship in alternate fashion and form the bottom of the parison transporting device are secured to the side wall elements. The side wall elements are movable towards and away from each other. In the tube receiving position, the side wall elements are spaced apart from each other to such a degree that a parison tube can be placed in straight fashion between the side wall elements. The side wall elements are subsequently moved towards each other up to a distance corresponding to the thickness of the parison tube, whereby the parison tube is exactly shaped in the form of the mold cavity of the blow mold. The side wall elements are moved apart above the blow mold to such an extent that the parison tube drops into the mold cavity. The parison transporting device is now moved linearly.

8 Claims, 6 Drawing Sheets

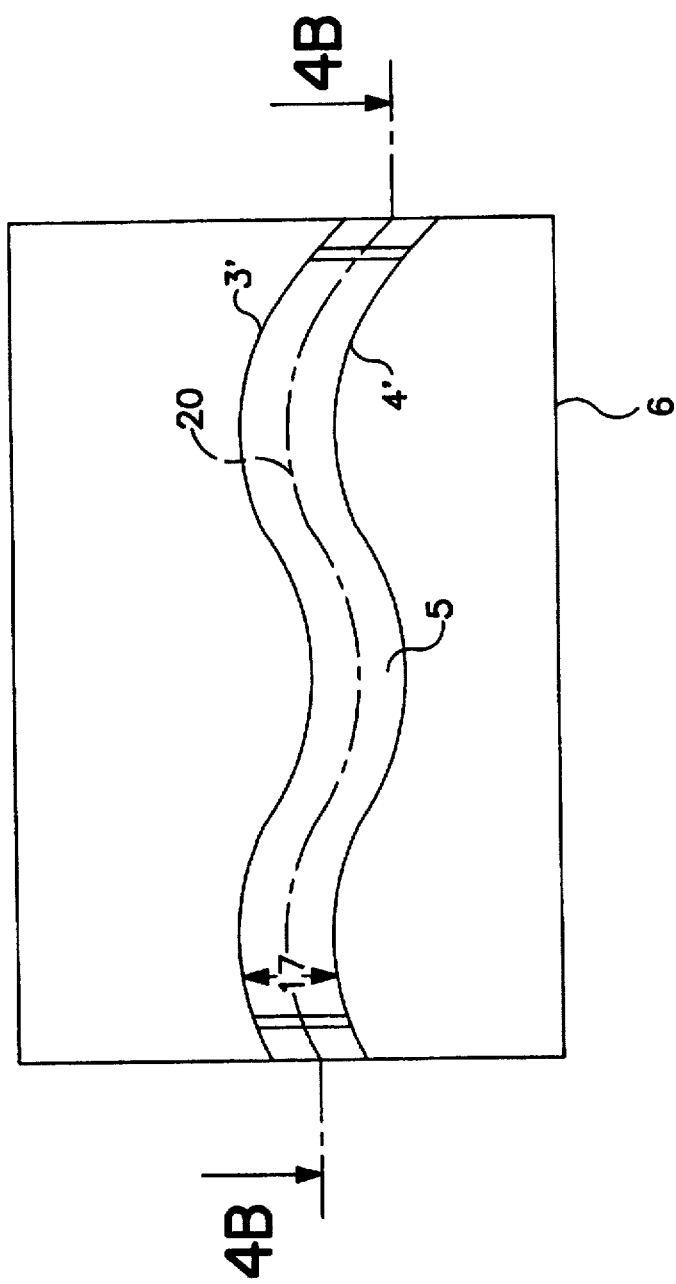
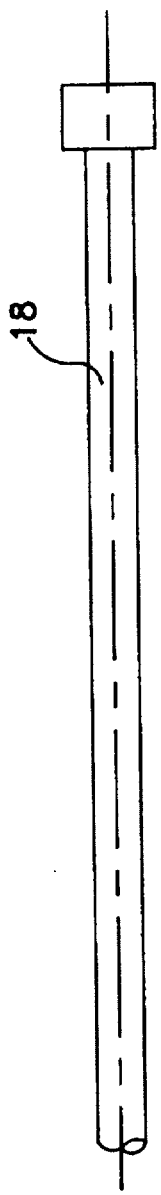

DEVICE FOR TRANSPORTING A PARISON FROM THE TUBE FORMING HEAD TO THE BLOW MOLDING MACHINE

BACKGROUND OF THE INVENTION

The present invention relates to a parison transporting device.

When hollow plastic articles, such as tubular pieces which are bent once or several times, are produced, it is difficult to insert the tubular parison into the blow mold. Since the mold cavity of the blow mold which corresponds to the hollow plastic article to be produced has more than one axis, and since these axes are at angles with one another in space, i.e., the mold cavity may consist of a plurality of sections extending upwards and downwards towards both sides, the part of the blow mold that is either in a horizontal position or in an inclined position can be moved back and forth and also up and down accordingly while a tubular parison is being discharged in straight fashion, or these movements can be performed by the extruder when the mold is at a standstill. Since either the whole mold closing support including the blow mold or the extruder with the associated tube forming head must be moved in three axes perpendicular to one another, considerable weights must be moved, as both the mold closing support and the extruder itself weigh several tons, even in the case of small machines.

To avoid movement of one of the two heavy subassemblies extruder/tube forming head or mold closing support with blow mold, DE 43 05 735 C1 suggests a lightweight interim transporting mold which includes an upwardly open mold trough whose bottom can be opened. This interim transporting mold receives the tube exiting from the tube forming head and is then moved to the blowing station to hand over the tube to the blow mold. The interim transporting mold is of little weight, one of the reasons being that no closing forces have to act on it and no cooling channels have to be accommodated therein, so that it can be moved with considerable smaller effort than one of the subassemblies extruder/tube forming head or mold closing support with blow mold.

The mold trough of the interim transporting mold according to DE 43 05 735 has the shape of the mold cavity of the blow mold. To receive the tube exiting from the tube forming head, the interim transporting mold is moved in its tube receiving position in both horizontal directions and is lifted or lowered in vertical direction until the whole tubular piece rests in the mold trough. The interim transporting mold is subsequently positioned above the lower part of the blow mold such that its mold trough lies vertically above the mold cavity of the blow mold, whereupon the bottom of the mold trough is opened, so that the parison drops into the mold cavity.

Such an interim transporting mold has turned out to be best suited in practice. However, with such a prior-art solution for the problem of avoiding movement of great weights, the interim transporting mold must be moved below the tube forming head in three dimensions, requiring an expensive controlling and moving mechanism.

As far as the production of pipe bends is concerned, it is suggested in DE 30 38 590 C2 that the free end of a thermoplastic parison should be seized by a blow pin which is forcibly guided on an arm in such a manner that the blow pin inserts the parison into the mold cavity of a lower blow mold half.

SUMMARY OF THE INVENTION

It is the object of the present invention to provide a parison transporting device for a blow molding machine whose moving mechanism is very simplified and to maintain the above-mentioned advantages at the same time.

It is another object of the present invention to provide a method for producing hollow plastic articles, which are bent once or several times, at low costs.

The parison transporting device according to the invention includes side wall elements whose edge contours correspond to those of the mold cavity of the blow mold, i.e., have the same curvature as the cavity when viewed from above. The side wall elements are arranged such that they can be moved towards and away from each other. This makes it possible to space apart the side wall elements in the tube receiving position below the tube forming head to such an extent that the parison tube can be placed in straight fashion between the elements on the bottom elements which close the bottom in this position. In a second operative position, the side wall elements are moved towards each other such that their distance substantially corresponds to the thickness of the parison tube, whereby the parison tube previously positioned on the bottom in straight fashion is given a shape whose curvature corresponds to that of the mold cavity of the blow mold. When the parison transporting device is then positioned above the blow mold such that the center line is located between the side wall elements or the center line of the curved parison above the center line of the mold cavity of the blow mold, the bottom of the parison transporting device is opened, so that the parison drops into the mold cavity.

The parison tube can here be molded immediately after the tube has been placed in straight fashion between the side wall elements after clamping plates have been moved relative to one another for squeezing off the tubular piece so as to separate it from the subsequent tube and to close the tube thereby. So-called support air which is admitted through a nozzle of the tube forming head into the tube while the tube is being discharged, is entrapped in the parison tube, so that the latter cannot collapse.

It is, however, within the scope of the invention to move the side wall elements towards the mold cavity or, however, above the mold cavity towards each other while the parison transporting device is being transported so as to change the tube into a curved parison.

The bottom of the parison transporting device may be even, preferably horizontal, it may also extend in accordance with the curvature of the mold cavity of the blow mold in height direction (Z-direction) to avoid differences in length.

The side wall elements may each be firmly connected to the associated bottom elements. To this end, the invention suggests in a further embodiment that the bottom elements should be rods which in the longitudinal direction of the parison transporting device are secured to the side elements in alternately offset relationship with each other, and are preferably embedded therein. As already mentioned, all of these rods may be arranged at the same height or may be positioned in accordance with the course of the mold cavity one above the other or below the other.

The rods can have a semicircular diameter without the invention being restricted thereto. Rods with a rectangular cross-section may also be used.

Instead of rods, plate-like elements may be used that can be secured to the right and left side wall elements also alternately.

Furthermore, the bottom elements, for instance the rods, should have such a length that they overlap one another in the tube receiving position in which the side wall elements which extend in curved fashion when viewed from the top have thereinbetween at least a continuous straight and free space of a width that is slightly greater than the thickness of the tube to be received, so that the parison tube rests on closely adjacent points. To enable the side wall elements to move towards each other to such an extent that only a spacing preferably corresponding to the thickness of the tube is left between them, bores should be formed in the side wall elements for the entry of the bottom elements, for instance rods of the opposite side.

It should be noted that the invention is not limited to the feature that both side wall elements are moved for reducing their distance, but there may also be chosen such a configuration that one side wall element is arranged stationary whereas the other side element is made movable.

When the bottom elements are fixedly connected to the side wall elements, the bottom of the parison transporting device is expediently opened in that the side wall elements are moved apart to such an extent that the free ends of the bottom elements have formed thereinbetween a sufficient space through which the parison can drop into the mold cavity.

However, it is also within the scope of the invention that the bottom elements are arranged to be movable relative to the side wall elements. In such a case rods may be provided which respectively pass through the associated side wall elements, to which end the rods may, for instance, be seated in pneumatic cylinders arranged on the outside of the side wall elements. In this development of the invention the rods can be moved in the tube receiving position inwardly to such an extent that they overlap in the tube receiving portion, the overlap being not absolutely necessary. When the side wall elements are then moved to each other to give the tube a curved shape, the rods can remain in the extended length and enter into bores of the opposite side, and it is here within the scope of the invention that the rods are also bent or pressed rearwards. To release the parison from the mold cavity of the parison transporting device downwards, the bottom rods can then be retracted outwards without the spacing between the side wall elements being varied, which has the advantage that the parison keeps its predetermined curved position in an absolutely reliable manner while the rods are being retracted, since it rests on the side walls of its mold cavity.

The parison transporting device of the invention is only moved linearly, i.e. both in the tube receiving position below the tube forming head and when approaching the blowing station.

The side wall elements are also moved back and forth only linearly, so that the parison transporting device only requires a simple moving mechanism.

Further features of the invention become apparent from the following description of a preferred embodiment and from the drawing.

BRIEF DESCRIPTION OF THE DRAWINGS

FIG. 4A is a top view on the mold cavity of the blow mold;

FIG. 4B is a side view of the longitudinal bar of the parison transport device according to FIG. 1.

DESCRIPTION OF THE PREFERRED EMBODIMENTS

Figure 2:
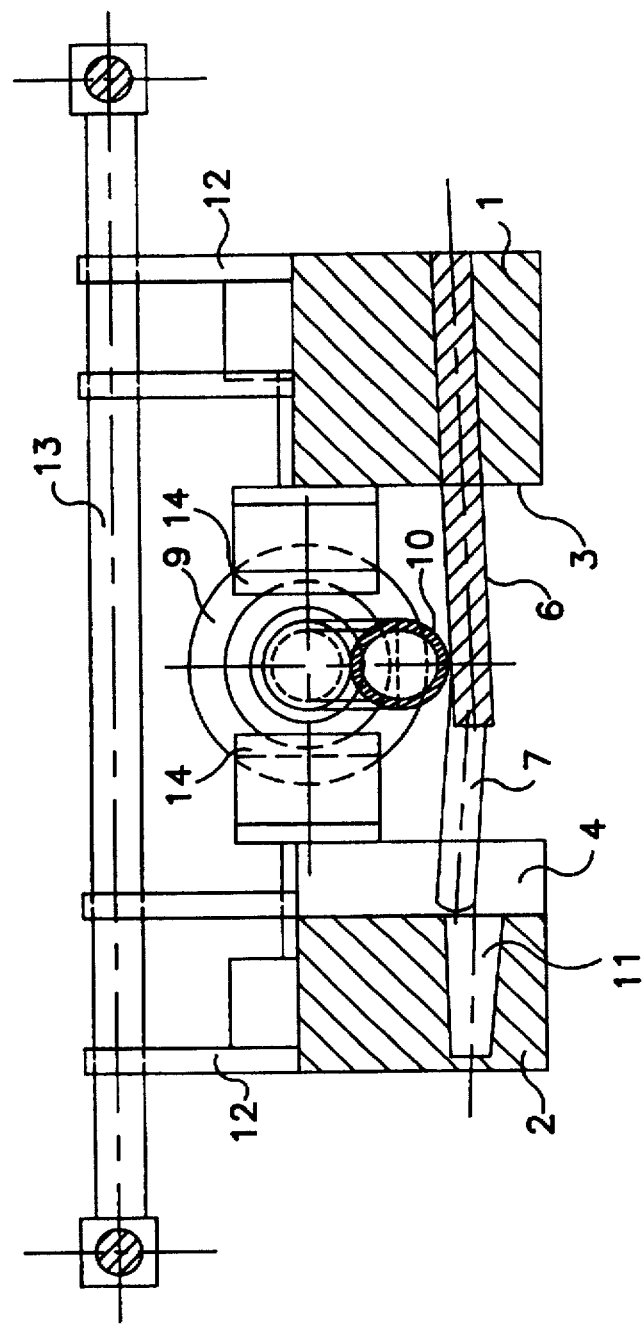
FIG. 2 is a vertical section through the parison transporting device according to FIG. 1 along line 2—2.

The parison transporting device includes two side wall elements 1, 2 whose inner sides facing each other have edge contours 3, 4 when viewed from above, the contours corresponding to those of the mold cavity 5 of the lower blow mold half 6 (FIG. 4). When viewed in vertical section, the inner wall surfaces 3, 5 extend in vertical direction as shown in FIG. 2.

Rods 6, 7 which in the longitudinal direction 8 of the parison transporting device are secured in alternately offset relationship are embedded in side wall elements 1, 2. The rods 6, 7 overlap in the tube receiving state of the parison transporting device in the area which receives, in straight fashion, a parison tube 10 exiting from a tube forming head 9. The tube forming head 9 is arranged in horizontal direction.

The rods 6, 7 which are secured to a respective side wall element have formed opposite thereto in the respectively other side wall element bores 11 that are entered by the free end sections of rods 6, 7 when the side wall elements 1, 2 are moved towards each other to such a degree that the distance between their inner walls 3, 4 substantially corresponds to the thickness of the parison tube 10. This state is referred to as a "closed" state.

Figure 1:
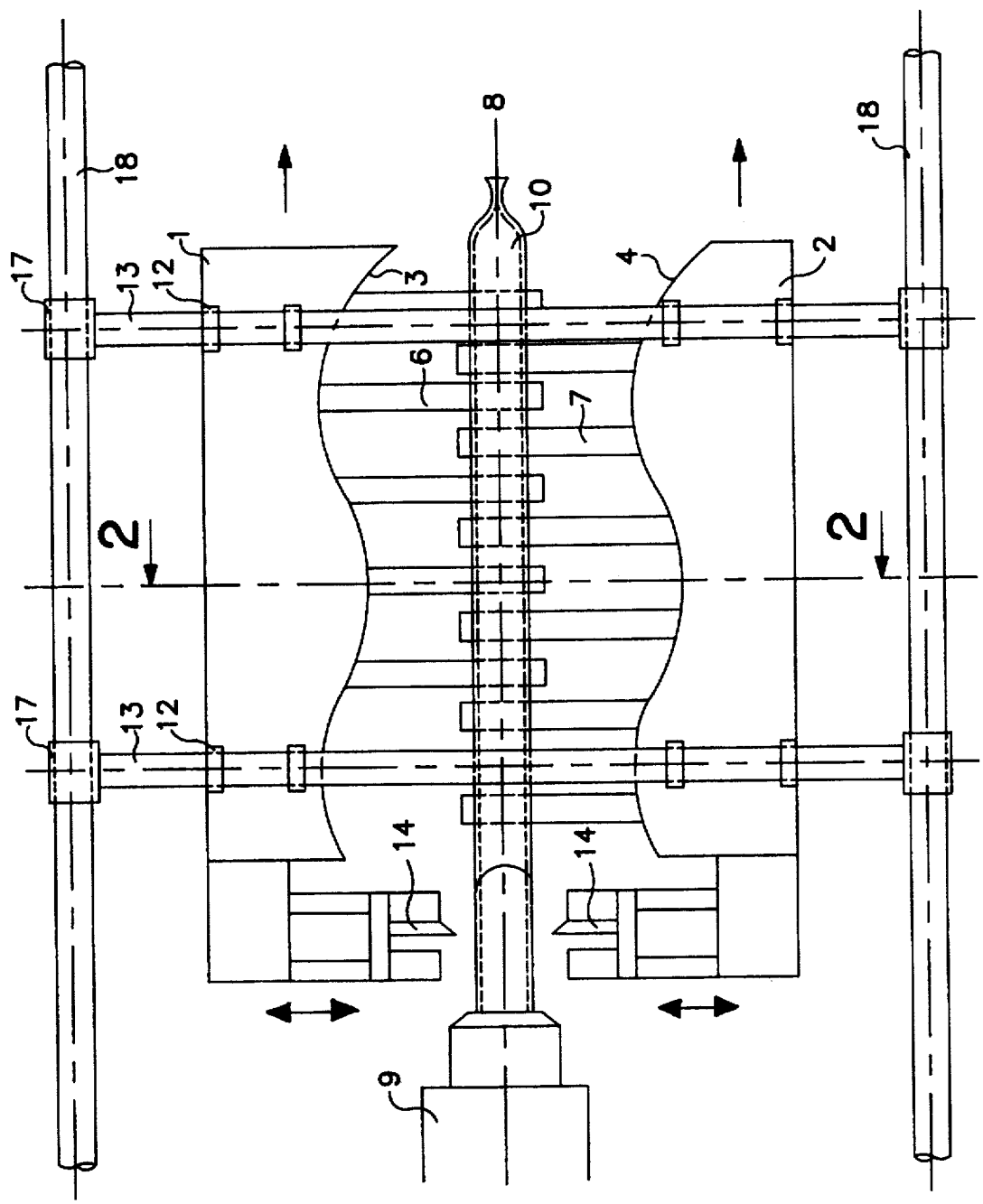
FIG. 1 is a top view on an embodiment of the parison transporting device in the tube receiving position.

The side wall elements 1, 2 are suspended by means of holders 12 to transverse bars 13 and are guided thereon, for instance, on sleeves provided with ball bearings. The side wall elements 1, 2 can be moved towards and away from each other with the aid of drive means (not shown), for instance, pneumatic piston/cylinder assemblies, as outlined by the double-headed arrow in FIG. 1.

Two opposite clamping plates 14 are secured to the rear face side of the side wall elements 1, 2 with the components required for their operation, such as holder, guide, actuation means, etc. The clamping plates are moved towards each other when the tube 10 which has exited from the tube forming head 9 and has been placed on rods 6, 7 has reached a predetermined length, whereby the end 15 of the parison tube 10 as well as the beginning 16 of the subsequent tube piece are closed. Since support air is blown into the tube when tube 10 is being discharged, the support air is entrapped in the parison tube 10 after the latter has been separated and closed, so that the parison tube 10 cannot collapse.

Figure 3:
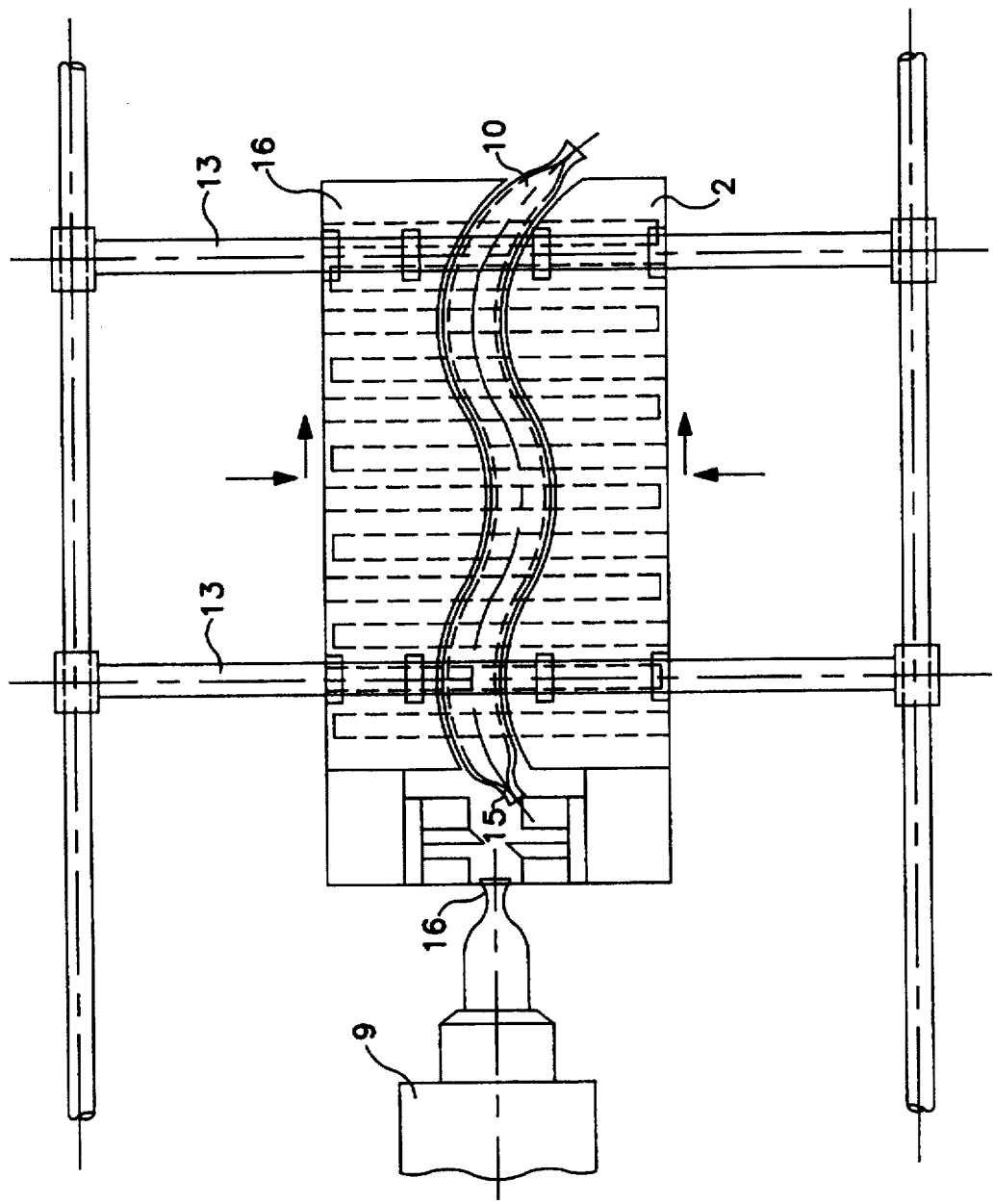
FIG. 3 shows the parison transporting device according to FIG. 1 in its closed state.
Figure 5:
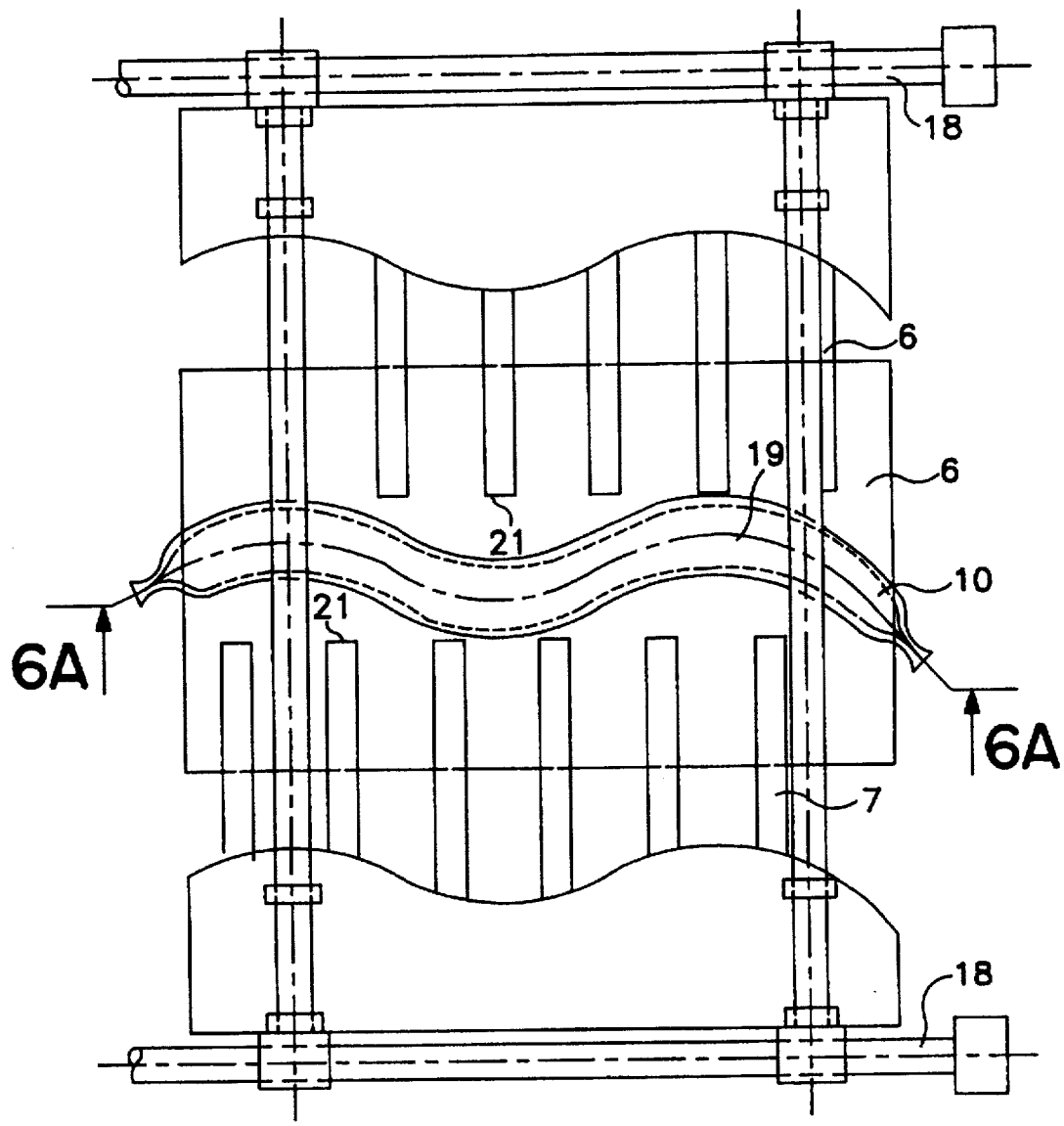
FIG. 5 is a top view on the parison transporting device in its widely opened state for releasing the parison.

FIG. 3 shows the closed state of the parison transporting device in which the parison tube 10, when viewed from above, has assumed a shape which is identical with that of the mold cavity 5 of the lower blow mold half 6, with the exception that the distance between the inner walls 3, 4 of the side wall elements 1, 2 is smaller than the width 17 of the mold cavity 5, since the parison tube 10 in the mold cavity 5 has still to be blown up to form the final product.

The transverse bars 12 are movably secured to longitudinal bars 18, being again guided, for instance, on ball-bearing sleeves 17. The longitudinal bars 18 extend from the blow head 9 (strictly speaking beyond the head) to the blowing station. A drive means (not shown) moves the parison transporting device between the tube receiving position and the parison discharge position.

When the parison transporting device has been positioned above the lower blow mold half 6 in such a manner that the center line 19 of the parison tube 10 is located above the center line 20 of the mold cavity 5 of the lower blow mold half 6, the parison transporting device is widely opened by moving the side wall elements 1, 2 apart to such an extent that the parison tube 10 can fall down between the free ends 21 of rods 6, 7.

Alternatively, the releasing operation may be performed such that in the closed state (FIG. 3) the rods 6, 7 are moved outwards out of the side wall elements 1, 2 until the whole bottom of the space between the side wall elements 1, 2 is open.

Figure 6A:
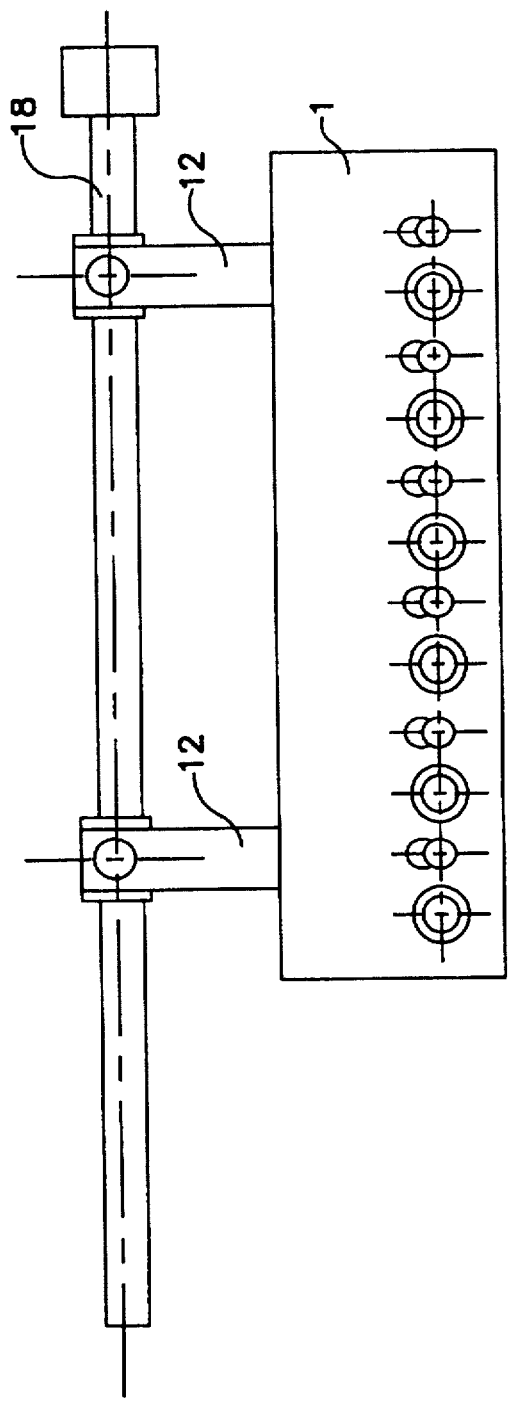
FIG. 6A is a vertical section along line 6A—6A in FIG. 5.
Figure 6B:
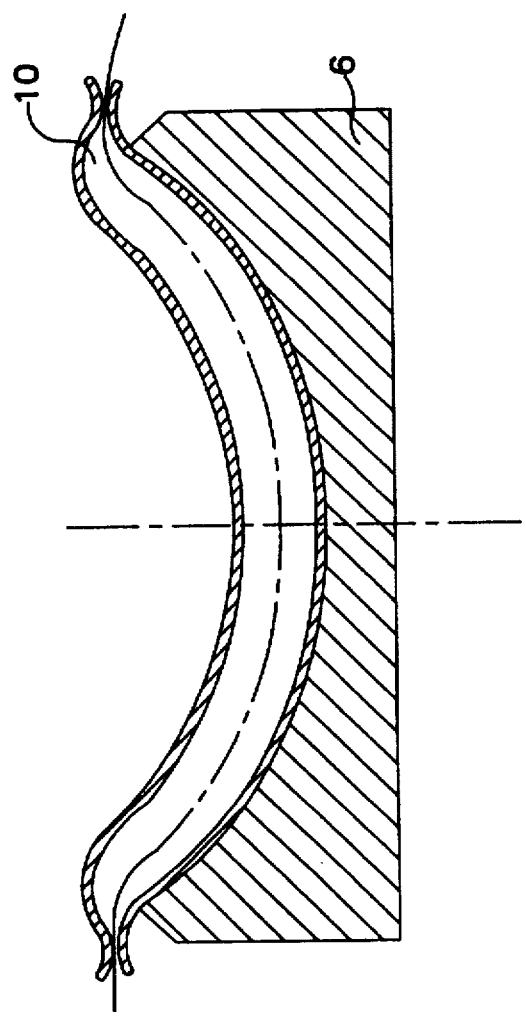
FIG. 6B is a sectional view of the lower mold half of the parison transport device according to FIG. 6A.

FIG. 6 shows the state in which the parison tube 10 is arranged in the mold cavity 5 of the lower blow mold half 6. The blow mold is now closed by means of the upper blow mold half (not shown), whereupon air is preferably introduced by a blowing needle (not shown) into the parison tube, thereby pressing the tube against the wall of the mold cavity 6 and shaping the desired hollow body. The parison transporting device is again moved into the tube receiving position.

What is claimed is:

1. A parison transporting device movable between a tube forming head and above a lower half of a divided blow mold cavity having edge contours, said device comprising a pair of side wall elements having inner facing surfaces, said facing surfaces having a shape corresponding to the entire length of the edge contours of the divided mold cavity when viewed from above, and means for moving said side wall elements toward and away from each other.

2. The parison transporting device of claim 1 additionally comprising bottom wall elements connected to said side wall elements.

3. A parison transporting device movable between a tube forming head and above a lower half of a divided blow mold cavity having edge contours, said device comprising a pair of side wall elements having inner facing surfaces, said side wall elements being provided with overlapping rods, said facing surfaces having a shape corresponding to the edge contours of the divided mold cavity when viewed from above, and means for moving said side wall elements toward and away from each other.

4. The parison transporting device according to claim 2, wherein said bottom elements are movably held on said side wall elements.

5. A parison transporting device movable between a tube forming head and above a lower half of a divided blow mold cavity having edge contours, said device comprising a pair of side wall elements having inner facing surfaces connected to rods which in a longitudinal direction of said parison transporting device are secured to said side elements alternatively in offset relationship with each other, said facing surfaces having a shape corresponding to the edge contours of the divided mold cavity when viewed from above, and means for moving said side wall elements toward and away from each other.

6. The parison transporting device according to claim 5, wherein said side wall elements are provided with overlapping rods.

7. The parison transporting device according to claim 5, wherein holes are formed in said side wall elements for the entry of rods of the opposite side.

8. The parison transporting device according to claim 5, wherein said rods are movably held on said side elements.

* * * * *